US005438916A

United States Patent [19]

Dornbush et al.

[11] Patent Number: 5,438,916
[45] Date of Patent: Aug. 8, 1995

[54] COOKING SYSTEM AND ACCESSORIES

[75] Inventors: David A. Dornbush, Prior Lake; Steven Alseth, Cologne; Chad S. Erickson, Plymouth, all of Minn.; Theodore H. Rehmeyer, Winston, N.C.; N. Philip Sked, Bloomington, Minn.; Robert T. Lee, Clinton, N.C.

[73] Assignee: American Harvest, Inc., Chaska, Minn.

[21] Appl. No.: 37,310

[22] Filed: Mar. 26, 1993

Related U.S. Application Data

[63] Continuation-in-part of Ser. No. 2,213, Jan. 8, 1993.

[51] Int. Cl.⁶ .................................................. A47J 27/04
[52] U.S. Cl. .................................. 99/448; 99/450; 99/393
[58] Field of Search ............ 99/450, 449, 476, 474, 99/473, 385, 393, 448; 219/400, 401, 391, 392; 126/21 A, 19 R

[56] References Cited

U.S. PATENT DOCUMENTS

| | | | |
|---|---|---|---|
| D. 35,040 | 9/1901 | Handy . | |
| D. 58,205 | 11/1919 | Andrews, Jr. | D44/10 |
| 73,703 | 1/1868 | Elder . | |
| D. 176,971 | 2/1956 | Belnert | D44/1 |
| D. 215,907 | 11/1969 | Little | D28/3 |
| D. 251,650 | 4/1979 | Heller | D7/1 |
| D. 309,397 | 7/1990 | Strand | D7/354 |
| D. 309,692 | 8/1990 | Strand | D7/354 |
| D. 321,109 | 10/1991 | Erickson et al. | D7/350 |
| D. 321,110 | 10/1991 | Worrell et al. | D7/350 |
| 323,887 | 8/1885 | Rutter . | |
| D. 328,687 | 8/1992 | Dornbush et al. | D7/350 |
| 503,756 | 8/1893 | Uniack . | |
| 972,078 | 10/1910 | Harrison . | |
| 1,012,869 | 12/1911 | Lauzon | 99/450 |
| 1,056,237 | 3/1913 | Waller . | |
| 2,118,326 | 5/1938 | Richardson . | |
| 2,402,883 | 6/1946 | Gavalis | 99/440 |
| 2,724,764 | 11/1955 | Ritchie | 219/392 |
| 2,914,185 | 11/1959 | Le Vay | 211/60 |
| 3,088,393 | 5/1963 | Huckabee | 99/450 |
| 3,383,083 | 4/1968 | Givens et al. | 249/141 |
| 3,399,858 | 9/1968 | Luker | 249/117 |
| 3,577,908 | 5/1971 | Burg | 99/333 |
| 3,610,135 | 10/1971 | Sheridan | 99/428 |
| 3,908,535 | 9/1975 | Gordon | 99/426 |
| 4,176,591 | 12/1979 | Power | 99/430 |
| 4,185,125 | 1/1980 | Sakakibara et al. | 99/450 |
| 4,201,312 | 5/1980 | Basile | 220/314 |
| 4,296,682 | 10/1981 | Thompson | 99/426 |
| 4,329,977 | 5/1982 | Orter | 126/369 |
| 4,360,123 | 11/1982 | Blease | 220/323 |
| 4,378,729 | 4/1983 | Pierick | 99/400 |
| 4,384,513 | 5/1983 | Pierick | 99/400 |
| 4,563,946 | 1/1986 | Barlow et al. | 99/450 |
| 4,583,955 | 4/1986 | Toloczko | 99/426 |
| 4,649,053 | 3/1987 | Lamonica | 426/302 |
| 4,817,509 | 4/1989 | Erickson | 99/330 |
| 4,847,461 | 7/1989 | Gilmore | 99/449 |
| 5,056,424 | 10/1991 | Lai | 99/339 |
| 5,165,328 | 11/1992 | Erickson et al. | 99/330 |

Primary Examiner—David A. Scherbel
Assistant Examiner—Reginald L. Alexander
Attorney, Agent, or Firm—Merchant, Gould, Smith, Edell, Welter & Schmidt

[57] ABSTRACT

A rack invention includes a rack having a rack surface and a plurality of legs attached to the rack surface. Each of the legs is made of wire and has two straight segments extending downwardly from the rack surface and a connecting segment which connects together the straight segments. The connecting segment is shaped so as to allow the rack surface to be placed at one of a plurality of predetermined distances above the surface in the oven. The cooking rack invention also includes a plurality of such racks which may be used together in an oven. In such an instance, the length of the straight segments of one rack are different that those of another rack, so that the racks provide different ranges of height adjustability.

8 Claims, 12 Drawing Sheets

COOKING SYSTEM AND ACCESSORIES

This application is a continuation-in-part of U.S. Ser. No. 08/002,213, filed Jan. 8, 1993.

SUMMARY AND BACKGROUND OF THE INVENTION

The present invention relates to a system and methods for cooking of food products.

The present handle invention includes a handle adapted to replace a heater and blower system removably located in a central opening defined in a top enclosure of a countertop oven. The handle has a mounting system for removably attaching the handle to the top enclosure in order to replace the heater and blower system when the heater and blower system is removed. The handle enables a user to remove the top enclosure from the bottom enclosure by lifting up on the handle when the handle is installed in the top enclosure. In this manner, the countertop oven may be converted to a food server comprising the handle, the top enclosure, and the bottom enclosure.

The present cooking pan invention includes a pan having a generally flat, round bottom member, the bottom member defining a central opening. The pan further has an outer peripheral wall extending upwardly and being located at the outer diameter of the bottom member, the outer peripheral wall having a height of approximately one-half inch. In addition, the pan has an inner peripheral wall extending upwardly and being located at the periphery of the central opening, the inner peripheral wall having a height of approximately one-eight inch.

The present cooking pan system invention is a system for cooking food in an air oven. The system includes a plurality of spaced cup units having side walls defining a generally cylindrical configuration which smoothly transition into a bottom member with a substantially rounded connection between the side walls and the bottom member. The system also includes a thin, relatively flat wire frame for holding the cup units in position. The wire frame has outer and inner annulus members, wherein the circumference of the outer and inner annulus members are determined by a diametrical dimension defined by the generally cylindrical configuration of each cup unit. The annulus members engage the cup side walls in order to secure the cup units in a system configuration permitting the flow of heated air between the cup units.

The present cooking rack invention includes a rack having a rack surface and a plurality of legs attached to the rack surface. Each of the legs is made of wire and has two straight segments extending downwardly from the rack surface and a connecting segment which connects together the straight segments. The connecting segment is shaped so as to allow the rack surface to be placed at one of a plurality of predetermined distances above the surface in the oven. The cooking rack invention also includes a plurality of such racks which may be used together in an oven. In such an instance, the length of the straight segments of one rack are different that those of another rack, so that the racks provide different ranges of height adjustability.

A method invention of cooking foods in an air oven includes using a cooking pan having a hole in its center, wherein the air oven cooks food by circulating heated air throughout the air oven cook chamber. The circulating air is drawn back up into the center of the cooking chamber and reheated and directed back down to be circulated around food positioned on the cooking pan disposed in the air oven. The hole in the cooking pan creates a passage for the circulation of the heated air.

An alternative method invention of cooking food in an air oven having a cooking chamber includes positioning on a rack in the cooking chamber a food cooking system. The food cooking system placed on the rack has a frame and cup units positioned in the frame. In the method, the air oven cooks the food by circulating blower-driven heated air throughout the air oven cooking chamber. The circulating air is drawn back up into the center of the cooking chamber and reheated and directed back down to be circulated around the cup units. The frame cup units are spaced apart in order to allow the heated air to flow throughout the cooking chamber and between the cups back up into the top of the cooking chamber.

DETAILED DESCRIPTION OF THE PREFERRED EMBODIMENTS

The inventions described in the present application are particularly suitable for use with the countertop oven disclosed in U.S. Pat. Nos. 4,817,509 and 5,165,328, which are assigned to the same assignee as is the present application. U.S. Pat. Nos. 4,817,509 and 5,165,328 are incorporated by reference as if fully set forth herein.

A cooking device 10 as illustrated in FIGS. 5, 12, 16, 19 and 20, includes a base member 11, a top 12 and a powered heater unit 13. The heater unit 13 is in locked engagement with top 12 as hereinafter described. The cooking device 10 further includes a lower frame bracket 14 and an upper frame bracket 15 which are hingedly engaged such as by removable pin 17. The brackets 14 and 15 may be integrally secured to the base 11 and top 12 respectively, or alternatively, they may be removably secured such as by snap mechanism 18.

The base 11 may be suitably formed of a polymeric material that may be transparent and includes a circumferential wall 21, an integral lower wall 22 and a plurality of feet 23. The feet 23 serve to elevate the lower wall 22 upwardly from a support surface such as a countertop. The lower unit 11 may include a thickened upper rim 24 defining a slot 26 into which the top 12 may by lodged. The base 11 may further include a handle 27. The circumferential wall 21 further includes an annular rim which serves to support the rack 29 on which the food pieces may be disposed. The rack 29 may be of a wire construction.

The top 12 of the cooking unit 10 likewise includes a circumferential wall 31 and an upper wall 32. The wall 32 may be integral with wall 31; for example, produced by injection molding, or alternatively, vacuum molding. The upper wall 32 has an opening 32' defined therein for receipt of the powered heating unit 13.

The power heater unit 13 is illustrated in FIGS. 5, 12, 16, and 19. The power unit 13 includes an outer housing 46, which contains a heater (not shown) and a blower blade 43. The outer housing 46 is preferably made of injection molded plastic. A motor is preferably located in the area above the hinge. A belt extends between the motor and a shaft on which blower blade 43 is mounted.

The heater may be an open coil, resistance wire type, and may be thermostatically regulated to maintain cooking temperatures ranging from 150 to 450+ degrees F.

The open heater coil is used in order to achieve the lowest possible surface watt density. With adequate air flow, such an element is capable of transferring maximum heat to the air stream via conduction, while operating in the "black" heat range. In order for other types of heating elements, such as tubular types, to give off the same wattage given the same space and airflow, the heater would glow. Such a high surface watt density would result in overheating of the motor blower, the food being cooked, and plastic parts through an excessive radiation of heat. In addition, such an element would retain too much heat when the unit is shut off, causing additional overtemperature problems.

The heater assembly also incorporates an overtemperature device capable of shutting off power to the heater should the thermostat fail.

The blade 43 creates two air circulations. The first air circulation is throughout the heated chamber. The second air circulation passes a small portion of air over the heated coils in the heater. In other words, the small air current exits radially outwardly from the blade 43, reverses direction 180 degrees to be drawn in over the coil, then radially inwardly to the center of the heater, then downwardly into the center zone of the blade 43.

Electrical current is fed into the device 10 by way of electric cord 67. The cord 67 may include a conventional plug for insertion into a wall socket. The electrical current passes through switch mechanism 68 mounted in the upper portion 15. The switch 68 includes a sensing mechanism to provide shutdown of the unit in the case of overheating in the heating chamber and/or motor housing 41. A sensing mechanism may also be included which shuts down the unit if the top portion 12 is pivoted upwardly with the throw portion of the switch 68 in the "on" position.

Figure 19:
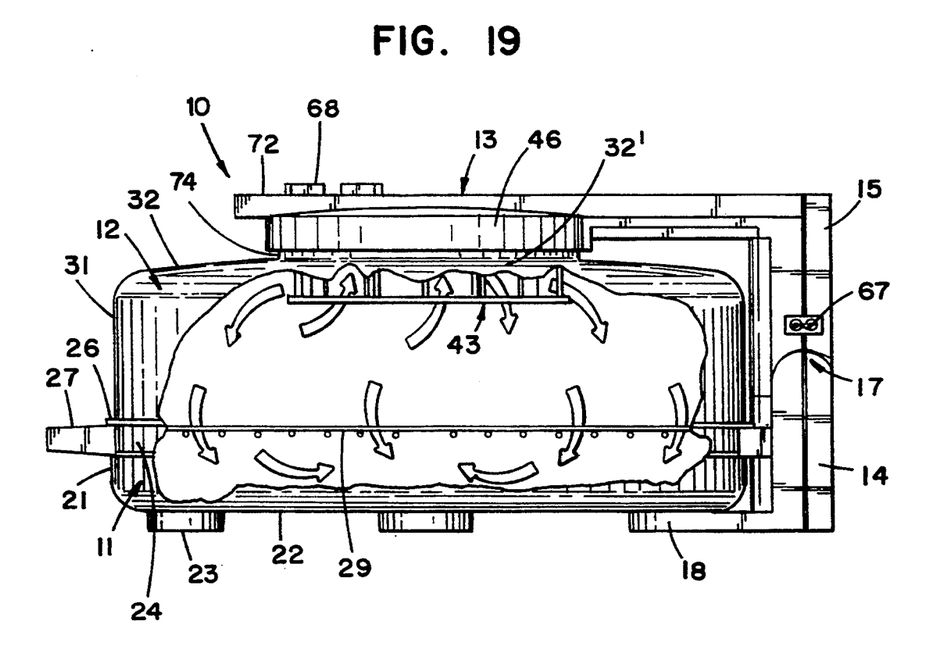
FIG. 19 is a sectional view of the upper and lower portions of a cooking device showing an electric motor fan and cyclonic circulation of air.

The air fryer disclosed may be placed in operation by pivoting the top portion 12 upwardly. Food pieces such as potatoes, bakery goods, pizzas and the like may be placed on the rack 29. The top portion 12 is then pivoted downwardly to the position illustrated in FIGS. 5, 12, 16, and 19. The switch 68 is then activated turning the heating element and the motor on. With the blade 43 rotating, air is moved within the chamber formed by the lower unit portion 11 and the upper portion 12, as shown in FIG. 19. Air is circulated over the resistance coil thereby providing heat to the chamber. The temperature will typically be in the range of 150–400 degrees F. If desired, a central wall may be mounted in the heated chamber to provide a disturbance and thus greater turbulence within the heated chamber.

Unlike conventional devices, the blower of the disclosed fryer is placed in the top center of the cooking chamber. The blower wheel is mounted in such a way as to project into the cooking chamber, its upper surface being at the same level or lower than the upper wall of the chamber. In this position, the air thrown off the wheel travels parallel horizontally to the upper wall of the chamber until it is directed downward by the radius joining the upper wall and the vertical round side wall. The air then travels downward until it is again deflected at the base of the outside wall by the radius joining the side wall with the lower wall of the enclosure. The air is then simultaneously pushed and drawn by the blower across the top of and beneath the cooking rack. As the air approaches the center of the enclosure, it is drawn up into the open underside of the blower wheel, where it is then recirculated through the same pattern described above.

The velocity of the air is not constant within the chamber, since the heated air converges as it moves to the center of the unit and is drawn into the blower. In the air fryer, the air cools as it contacts the food, but simultaneously accelerates as it converges on the center of the chamber. This change in velocity compensates for the dropping temperature by more effectively exchanging the heat remaining in the air. The result is very uniform cooking from the outer edge to the center of the cooking rack. The velocity of the air in the oven is preferably very high, in the range of 1000–4000 linear feet per minute in the vicinity of the food, with a range of 1200–2500 being particularly preferred.

When cooking items that cover most of the cooking rack, such as pizza, or that require a pan, such as cookies, airflow to the underside of the rack is hindered from being drawn back into the blower wheel. The trapped air swirls rapidly, but cools off significantly, due to inadequate air exchange with the heated air mass above the rack. To compensate for the above, one or more "mixing vanes" may be located diagonally under the cooking rack. This causes the air to form two or more counter-rotating air masses that dramatically improve the air exchange under the rack.

Figure 17:
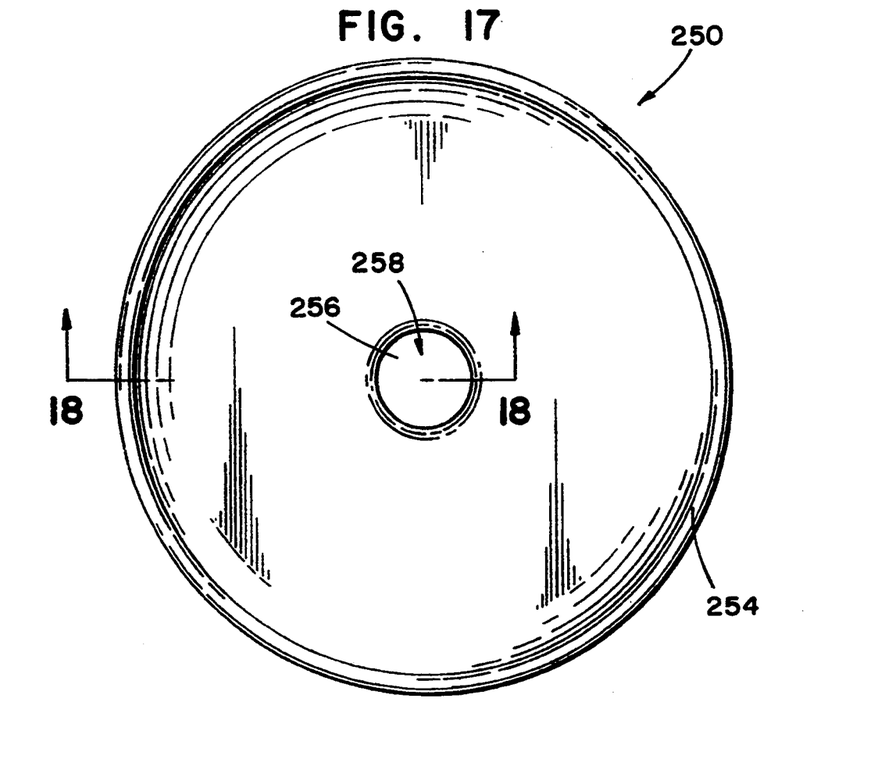
FIG. 17 is a top view of the cooking pan shown in FIG. 16.
Figure 18:
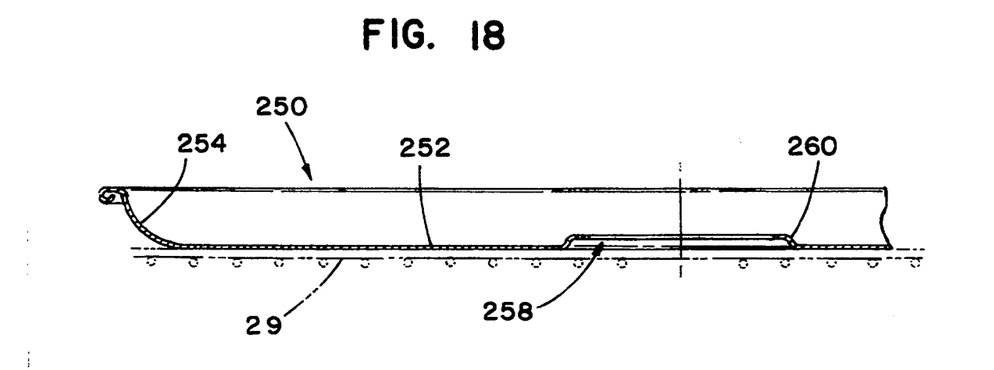
FIG. 18 is a view taken along lines 18—18 in FIG. 17.

Another method of solving the above mentioned problem associated with items that cover most of the rack is to use a cooking pan 250 having a hole in the center of the pan, as shown in FIG. 17. FIG. 17 shows a cooking pan 250 having a large flat-bottom surface 252 and a peripheral side wall 254. Peripheral side wall 254 is created by gradually inclining the bottom of the flat surface 252 until the side wall 254 is formed. The flat bottom 252 and peripheral side wall 254 are a continuous surface and the peripheral side walls slope upwardly and outwardly from the center 256 of the flat-bottom surface 252. The flat-bottom surface 252 of the cooking pan 250 has a circular opening 258 at its center 256. The circular opening 258 has an inner peripheral wall 260 sloping upwardly and inwardly.

The outer peripheral side wall 254 serves the function of a normal cooking pan. The circular opening 258 in the center 256 of the cooking pan 250 serves a purpose of allowing the cyclonic air to flow through the center of the cooking pan 250, thereby reducing the amount of air trapped beneath the cooking pan 250. This allows air to circulate more freely through the cooking chamber. The hole 258 in the center 256 of the cooking pan 250 in a preferred embodiment is approximately two (2) inches in diameter. However, other diameters may be more appropriate given the level of cyclonic air flow desired. The outside peripheral side walls 254 preferably slope upwardly and outwardly for approximately ½ of an inch. The inner peripheral walls 260 preferably slope upwardly and inwardly for approximately ⅛ of an inch. In addition, the cooking pan is preferably made of a conductive material having a layer of non-stick surface attached thereon.

The hole 258 in the center of the cooking pan allows for increased flow of cyclonic air, by allowing air to be drawn back up into the blower wheel 43.

Figure 16:
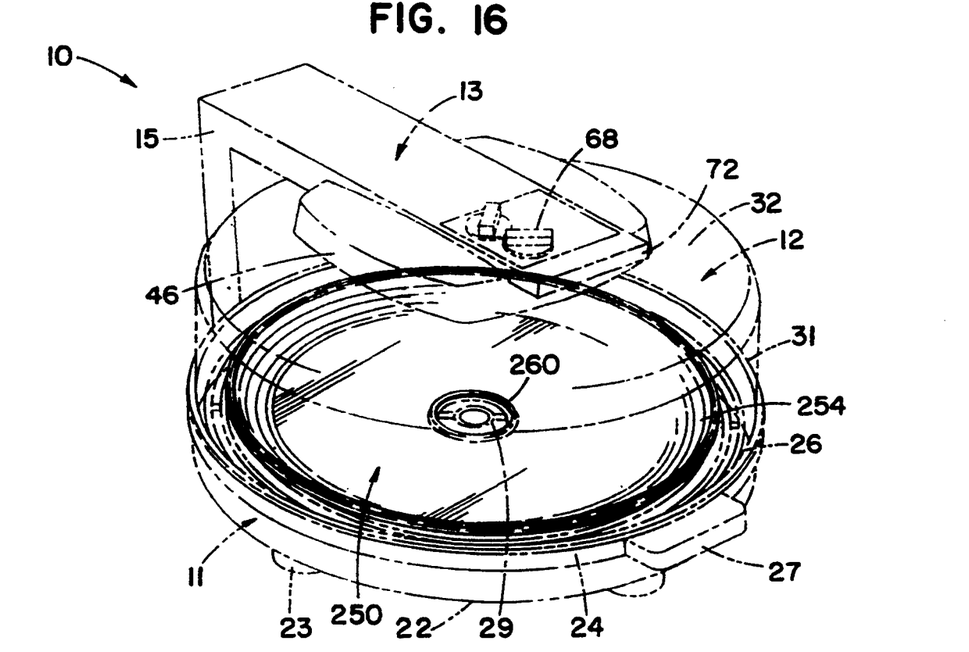
FIG. 16 is a perspective view of a cooking device showing its use with a cooking pan having a hole in at its center.

The cooking pan is preferably placed directly on top of the rack of the cooking oven as shown in FIG. 16. This allows the cooking pan to keep some distance between its bottom surface and the bottom of the cooking chamber base. This distance allows for a more complete circulation of air flow.

In addition to the cooking pan 250, another way to solve the problems associated with cooking items which cover most of the rack, such as muffin pans, is to use the muffin baking system of the present invention. A preferred embodiment of the muffin baking system 270 is shown in FIGS. 9-15.

The muffin baking system 270 involves a plurality of spaced cup units 272 positioned in a frame. Preferred cup units 272 have a flat bottom surface 274, peripheral walls 276 and peripheral rims 278. The peripheral walls 276 preferably are created by sloping the bottom surface 274 upwardly and outwardly. The bottom surface 274 and the peripheral wall 276 typically are one continuous surface. The peripheral rim 278 may be created by tightly rolling the edge of the peripheral wall 276.

There are a number of methods for attaching the cup units 272 to a frame for holding the cup units in position. The embodiment 270 shown in FIG. 13 involves the use of six cup units 272 and a frame system 288. In addition, there are a number of frame configurations, holding more or less than six cup units. An embodiment having a frame holding twelve cup units is shown in FIGS. 5-8.

Figure 13:
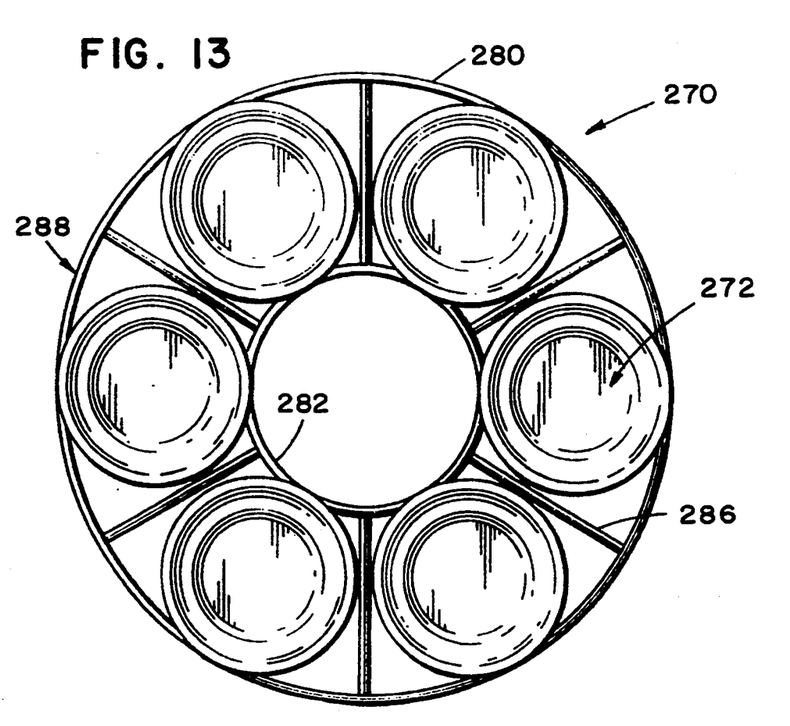
FIG. 13 is a top view of the 6-cup muffin cooking system shown in FIG. 12.

FIG. 13 shows a frame having six cup units 272. The cup units 272 may be attached to the frame, such as by clamping or by other means including welding. Clamping may be done by a number of different methods; the method proposed in the embodiment shown is by rolling a tab connected to the rim of the cup unit 272. The tab is rolled over the frame segments in at least two positions. In other embodiments, positions of tab rolling and frame connection may vary depending on the number of cups used and the number of annulus shafts used in the frame.

Figure 14:
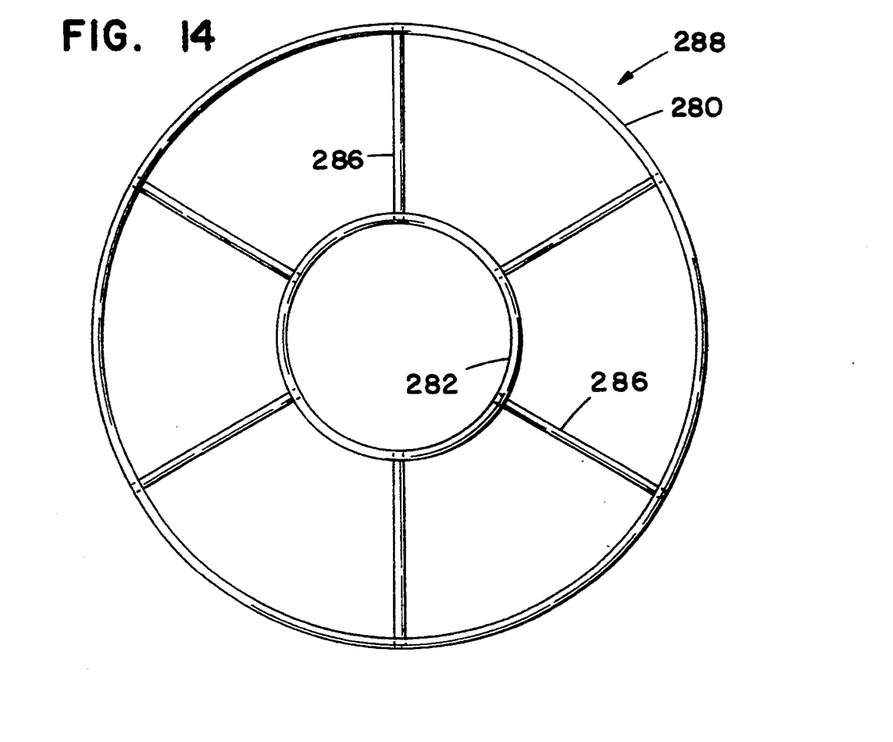
FIG. 14 is a top view of the frame of the 6-cup muffin cooking system shown in FIG. 12.
Figure 15:
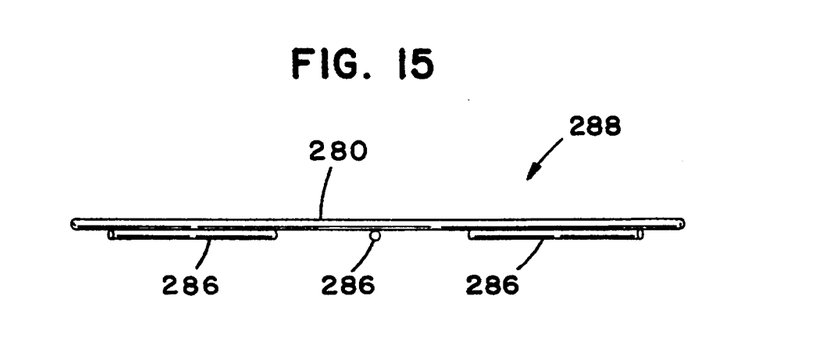
FIG. 15 is a side elevational view of the frame shown in FIG. 14.

FIG. 14 shows that the frame system 288 is preferably made up of an outer annulus shaft 280, an inner annulus shaft 282, and a plurality of frame connectors 286. The frame connectors typically extend radially between the inner and outer annulus shafts. Another embodiment allows the frame connectors 286 to continue until they meet at the center. The frame connectors may be welded together to created a spoked system. The cup units 272 may be connected to the outer annulus shaft 280 and the frame connectors 286.

FIGS. 5-8 illustrate an embodiment of the muffin baking system 300 having a twelve cup unit. The cup units 302 may be attached in at least two positions by welding the cup unit 302 peripheral rim to the frame system 214. In this embodiment there are 3 annulus shafts, outer 304, middle 306, and inner 308. The remainder of the frame system is shown comprised of four shafts 310, which may be welded to the annular members.

In either of the above-mentioned embodiments of the muffin baking system, the cup units typically are positioned on the rack 29 inside of the air oven 10. The muffin baking system structure allows for cyclonic air to more freely circulate throughout the cooking chamber. Air can be drawn up through the muffin baking system as required to keep the air heated and circulating in its cyclonic pattern. This frame structure eliminates the problems associated with muffin pans lacking holes within its structure.

As with any device that cooks a variety of foods, cleanability is a major concern. In most convection ovens, food particles, oil and grease are distributed over most interior surfaces of the oven. When these particles contact the heater in a convection oven, they burn, causing smoke, odor and cleaning problems. With the disclosed air fryer, such problems are largely eliminated due to the easy cleanability of the cooking enclosure and the design of the heater and its positioning.

The open coil heater in the disclosed air fryer is positioned directly above the blower wheel 43. The blower is fully open at the bottom, but also partially open on its top. As a result, the blower draws most of its make-up air into its bottom side, but also draws air into its top. This causes a portion of the air thrown out from the circumference of the blower to reverse direction and be drawn back through the heater perimeter, down through the open lower plate of the heater assembly and into the semi-open top of the blower wheel. This highly heated air is then mixed with the air being drawn in from the bottom of the blower. This mixture is then thrown out horizontally into the cooking chamber. This configuration provides the following advantage: most particles are unable to make the abrupt 180 degree change in direction that the air drawn through the heater does. Therefore, the air traveling through the heater assembly is virtually free of contamination, while most particles are thrown off to the sides and bottom of the cooking chamber, where they can easily be cleaned away. As a result of the above, the heater does not accumulate food, oil or grease, thereby eliminating the need to clean the heater, extending heater element life and preventing smoke or fire hazard.

Positioning the heater immediately above the blower saves substantial space, and allows for the compact design of an easily-removed blower assembly. When the assembly is removed, the entire cooking enclosure can then be washed in a conventional household dishwasher. The compactness allowed by the described heater position leaves more visibility through the top wall of the transparent cooking enclosure, providing the user with a maximum view of the cooking operation. Due to the blower wheel being located directly below the heater assembly, the blower wheel provides additional mechanical protection to the heater while further reducing the risk of electrical shock to the user.

The disclosed air fryer is designed to be easily disassembled, allowing the entire two piece cooking enclosure to be emersed in water for soaking or washing household dishwasher. The enclosure typically is molded of low-stick plastic capable of withstanding at least the maximum internal operating temperature of 400 degrees F. The blower assembly contains all electrical components and easily mounts in the top half of the cooking enclosure. The blower assembly is preferably connected to the cooking enclosure by way of a bayonet mount, but may also be connected by snapping in place by way of metal clips or screwing into place, much like the lid on a jar. The blower assembly is dimensioned to fit easily inside the cooking enclosure for storage, thereby saving on scarce kitchen storage space and reducing shipping and packaging expense.

Due to the extensive use of plastics and the need to keep assembly temperatures comfortable to the touch, internal cooling of the assembly is critical. The motor must also be kept within safe operating temperature limits.

To achieve the above objectives, the power unit 13 has been designed to draw cool, room temperature air in from directly above the hinge area. Drawing air from this point avoids taking in hot air rising off of the cooking enclosure. A cooling blade (not shown) located on the same shaft as the blower blade 43 serves to draw in this cool air. The cool air is pulled through the rectangular segment connecting the motor enclosure to the hinge. This "duct" may also house electronic components that are heat sensitive or require cooling, such as triacs. From here, the air is drawn over the motor, and is then exhausted downwardly through a gap 74 separating the cooking enclosure and the bottom edge of the blower assembly. Here the air serves a valuable function of cooling the cooking enclosure plastic at its most vulnerable point, close to the heater assembly.

Any deformation of the blower mount area due to overtemperature trouble would render the cooking enclosure useless. Gussets may be molded into the blower mount area to act as stiffeners and cooling fins for the plastic.

When the blower is removed from the cooking enclosure, the user may then install optional attachments to convert the air fryer into a steamer, a corn popper or other application that would fit the configuration and features of the cooking enclosure.

Figure 1:
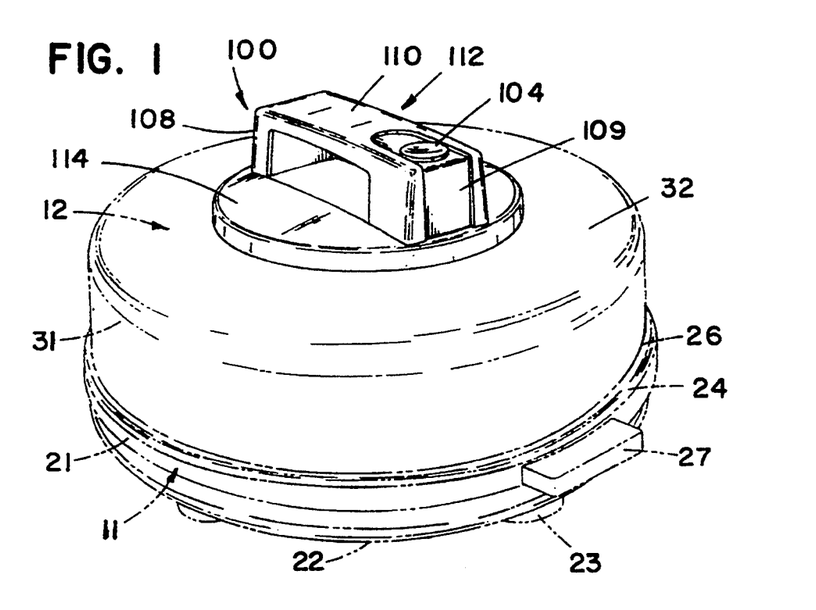
FIG. 1 is a perspective view of a food serving device having a steam and heat controllable handle engaged.
Figure 2:
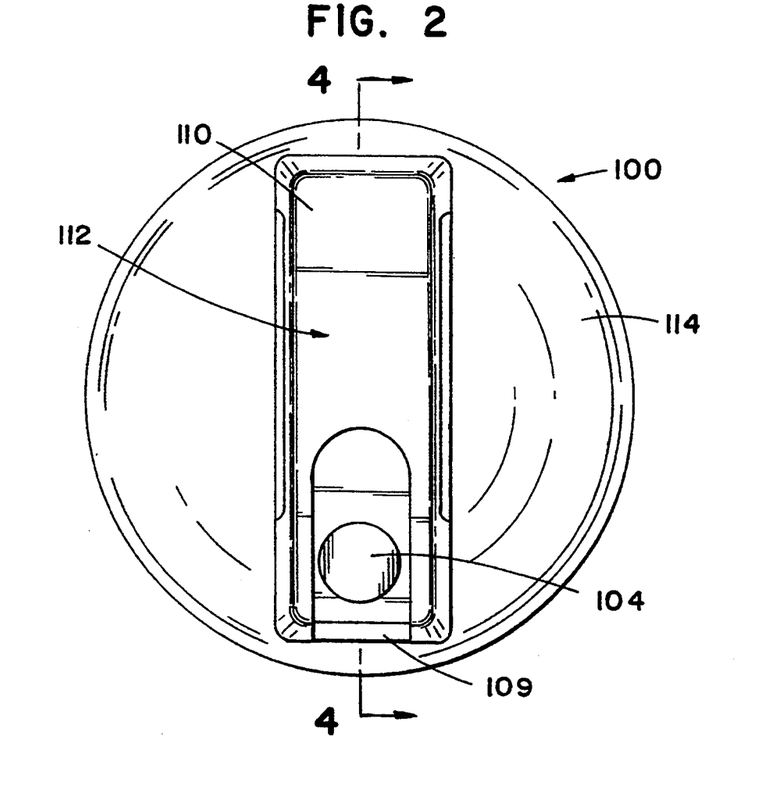
FIG. 2 is a top view of the steam and heat controllable handle shown in FIG. 1.
Figure 3:
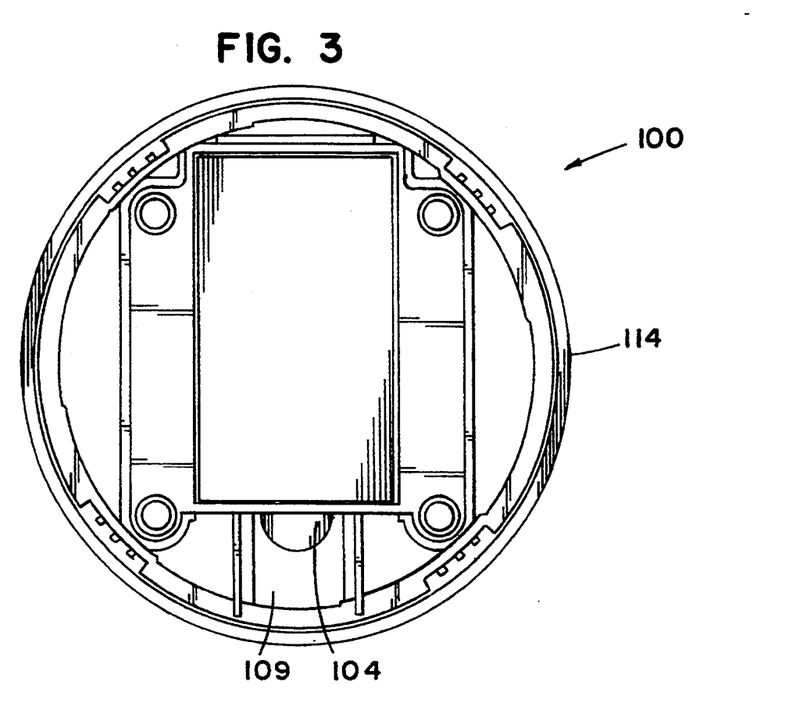
FIG. 3 is a bottom view of the steam and heat controllable handle shown in FIG. 1.

An important feature fitting the configuration that may be installed when the blower is removed is a steam and heat controlling handle. FIG. 1 illustrates an embodiment of the use of a steam and heat control handle 100, shown in conjunction with the frying oven.

The steam control handle interacts in the opening in the upper member 12 of the cooking chamber. The steam control handle 100 includes a handle portion 112 and a base portion 114. The base portion 114 is designed to mount on the upper wall 32 of the cooking chamber. The base portion preferably attaches to the upper wall in the same manner as does the blower assembly, such as by a bayonet mounting system. The handle portion 112 has a first riser portion 108 and a second movable riser portion 109. The handle portion 112 further includes a transverse portion 110 that forms a grippable handle. The sliding portion 109 may be opened so that steam entrapped in the cooking chamber may be released through an aperture 105.

Figure 4:
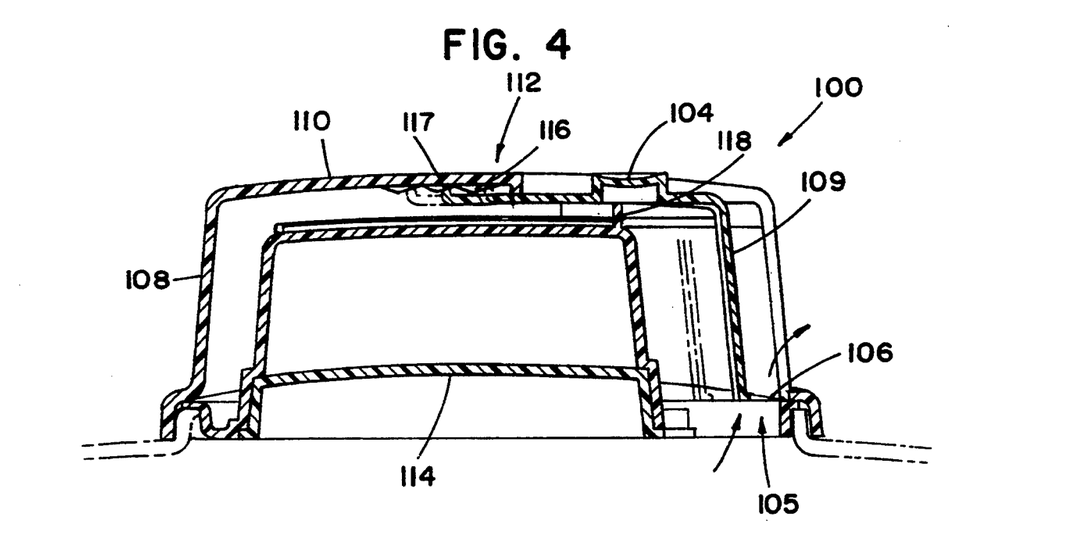
FIG. 4 is a view taken along lines 4—4 in FIG. 2.
Figure 5:
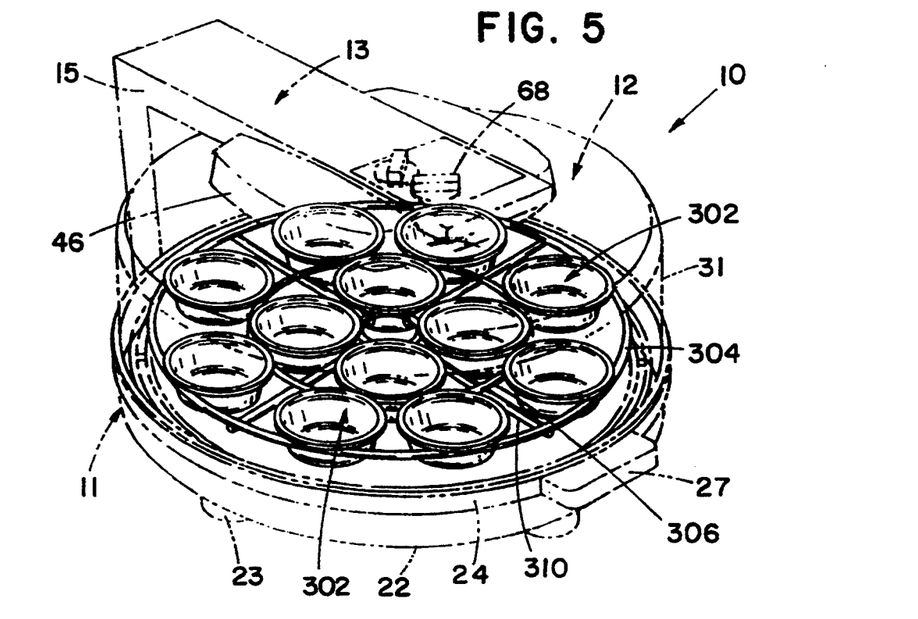
FIG. 5 is a perspective view of a 12-cup muffin cooking system.
Figure 6:
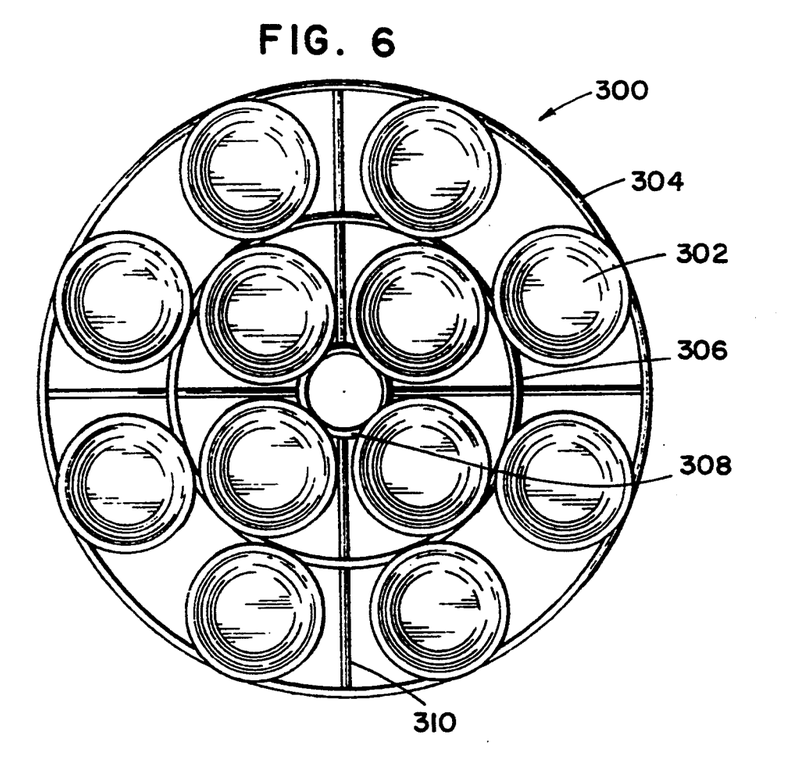
FIG. 6 is a top view of the 12-cup muffin cooking system shown in FIG. 5.
Figure 7:
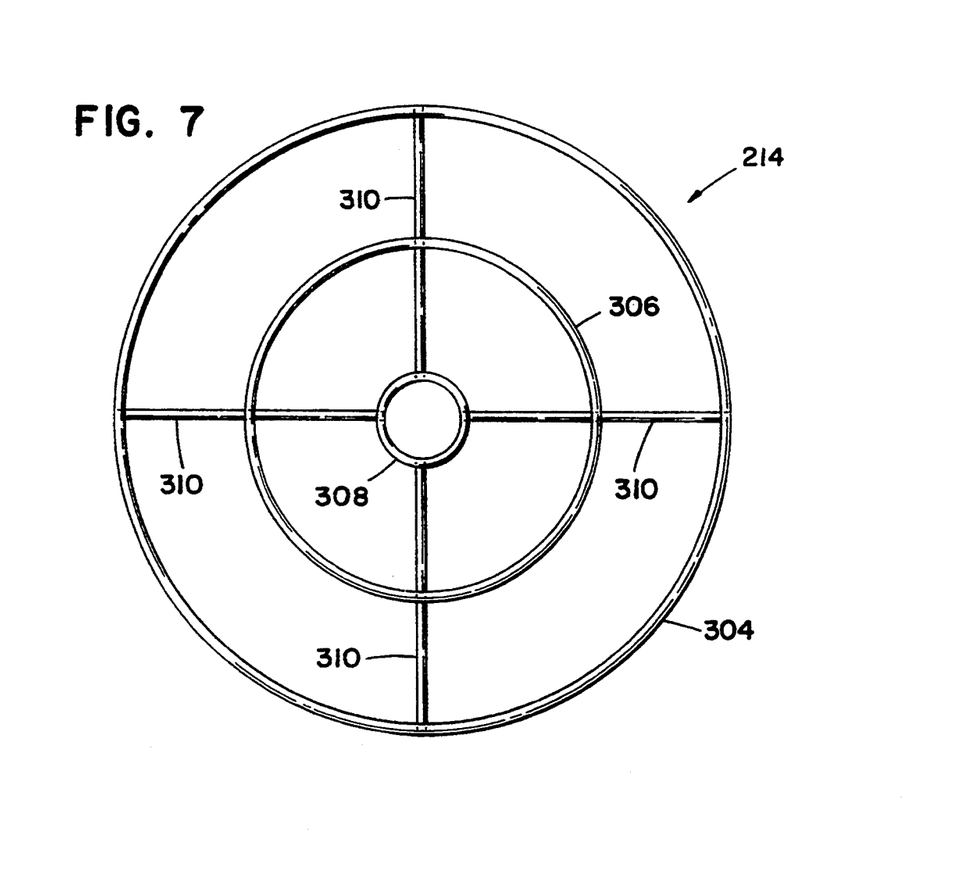
FIG. 7 is a top view of the frame for the 12-cup muffin cooking system shown in FIG. 5.
Figure 8:
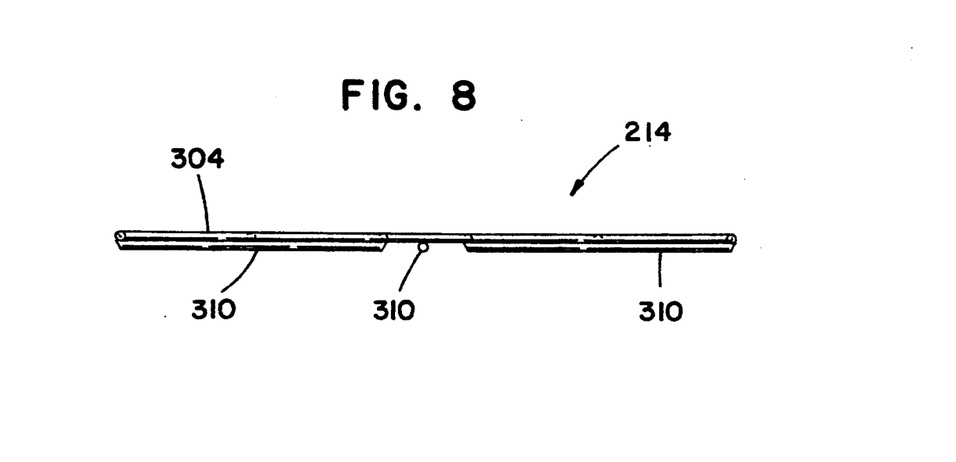
FIG. 8 is a side elevational view of the frame shown in FIG. 7.
Figure 9:
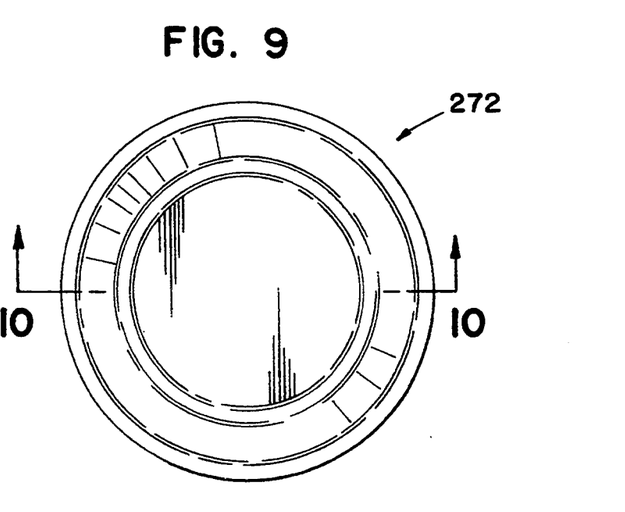
FIG. 9 is a top view of a muffin cup.
Figure 10:
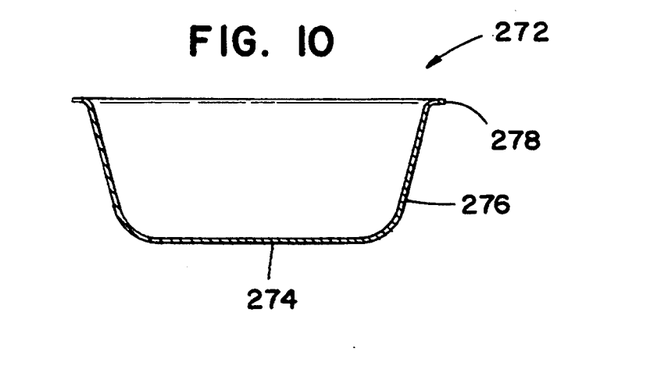
FIG. 10 is a view taken along lines 10—10 in FIG. 9.
Figure 11:
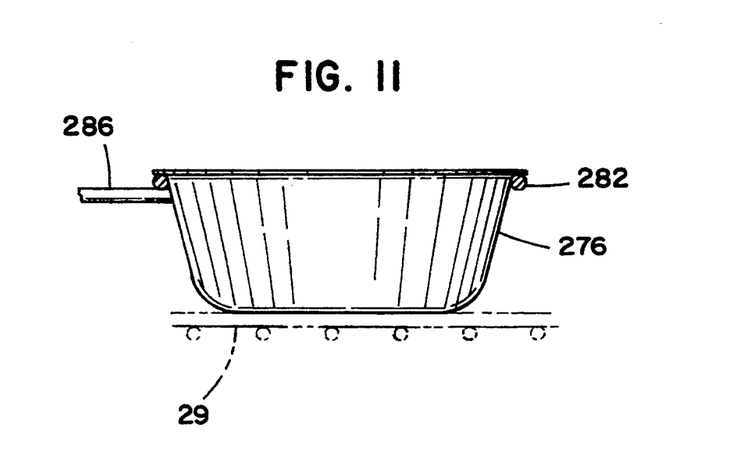
FIG. 11 is a sectional view of a muffin cup engaged with a frame of a muffin cooking system, showing the frame and the muffin cup engagement with a cooking rack.
Figure 12:
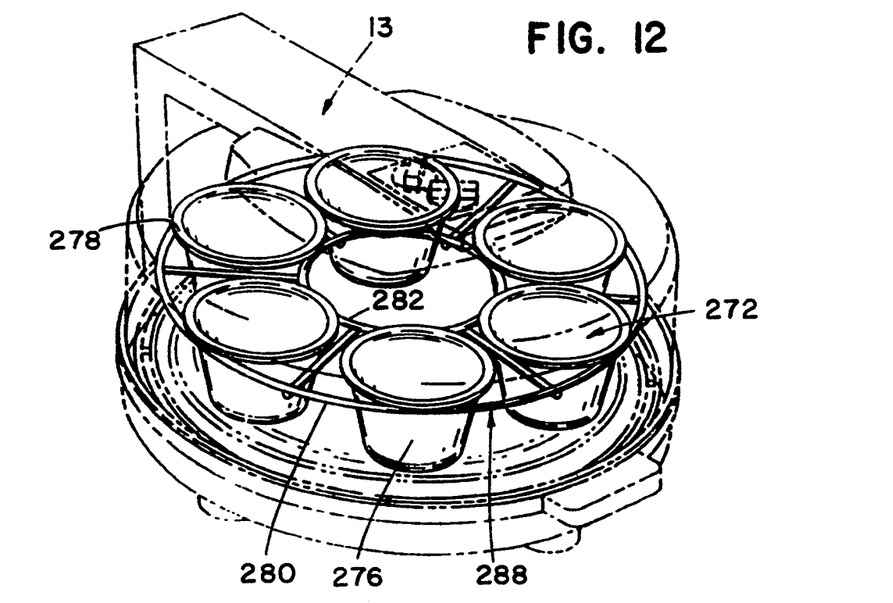
FIG. 12 is a prospective view of a 6-cup muffing cooking system.

The sliding portion 109 is movable from a first position, where the sliding portion covers the aperture 105, to a second position as shown in FIG. 4, wherein a space 106 is formed between the base portion 114 and the sliding portion 109. When the handle is so opened, steam is allowed to escape from the cooking chamber out through space 106 into the atmosphere. The opening is preferably approximately 1–1.2 square inches. When the sliding portion is moved so that the aperture 105 is covered, steam rises in the sliding portion 109 of the handle. A separation member 118 engages an upper portion 104 of the sliding handle 109 to prevent steam from entering the hollow chamber of the transverse portion 110 of the handle 100. In this manner, even with the sliding portion 109 in a closed position, steam will not enter the transverse portion 110 of the handle 100 so that the handle still may be held comfortably.

A ribbed portion 116 of the transverse portion 110 engages a raised end portion 117 of the sliding portion 109 to retain the handle in the closed or open position. FIG. 4 illustrates that there are three levels at which the handle may be retained. In addition, other embodiments may maintain more or less than three raised portions for retention of the handle.

The handle is preferably used to convert the oven from a cooking device to a food server. In particular, food may be placed within the oven of FIG. 19, and cooked as described above. When the food is done, the user simply removes the heater unit 13 from the top 12, such as by releasing the prefered bayonett mount. Lower frame bracket 14 and upper frame bracket 15 are preferably removed from the cooking enclosure as well. Handle 118 is then attached to top 12, for example by using the preferred bayonet mount. The oven is thereby converted to a serving container, which can be carried out to the dining table and used to serve the food.

Figure 20:
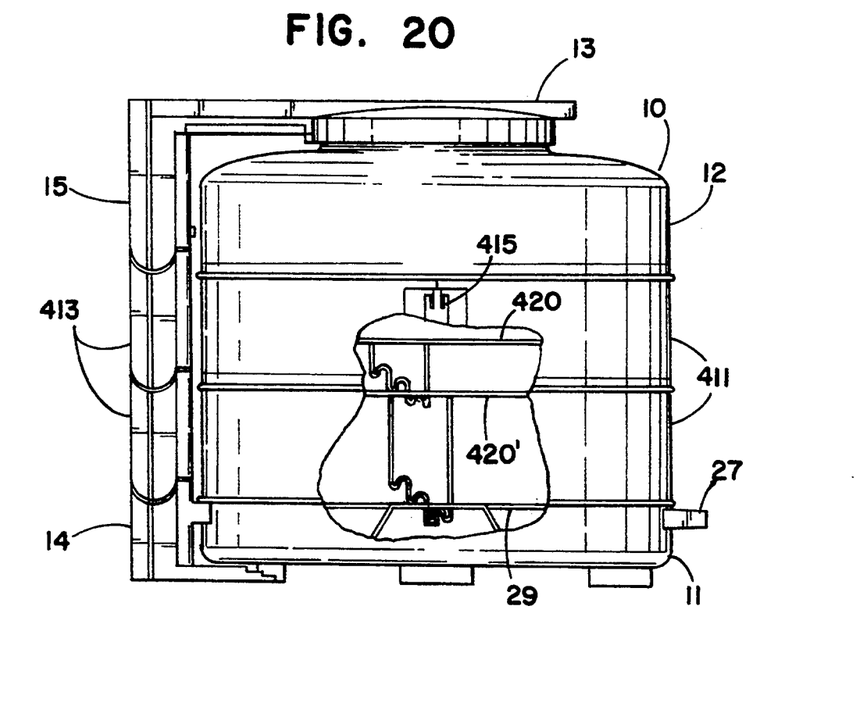
FIG. 20 is a side view of a cooking device which has been partially cut away to show a cooking rack system.

FIG. 20 shows a preferred embodiment of an oven employing preferred cooking racks. In FIG. 20, the oven 10 is shown as including two extension rings 411 and two extension segments 413. The extension rings 411 are placed between the base member 11 and top 12 so as to enlarge the size of the cooking chamber. The extension rings are preferably formed as two pieces connected together by clips 415. The extension segments 413 are placed between the lower frame bracket 14 and upper frame bracket 15 so as the accommodate the increased size of the cooking chamber.

Within the oven 10 of FIG. 20, two racks 420 and 420' can be seen. The rack 420 is shown in greater detail in FIGS. 22-23. As seen therein, the rack 420 includes a rack surface 422 and three legs 424. The rack surface is preferably made of approximately 13 gauge wire. The rack surface may be made up of a plurality of concentric wire rings 423 connected together by generally V-shaped wire connectors 425, such as by welding. This arrangement provides for a rigid surface upon which food can be placed.

Figure 22:
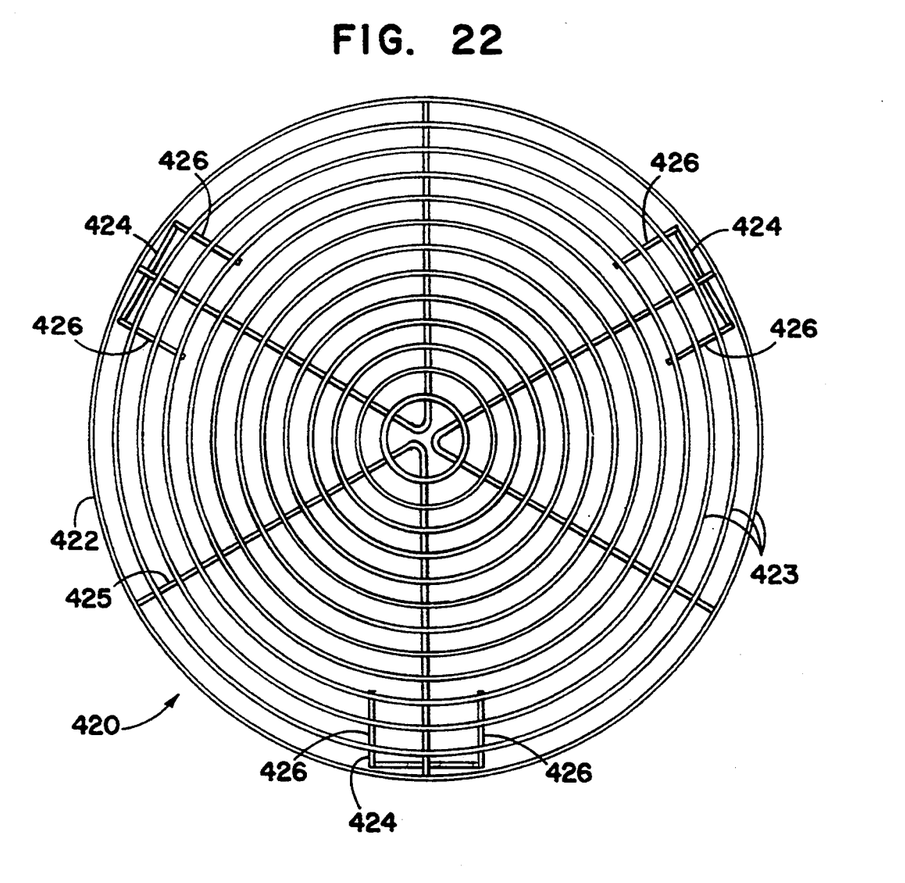
FIG. 22 is a top view showing a preferred cooking rack.
Figure 23:
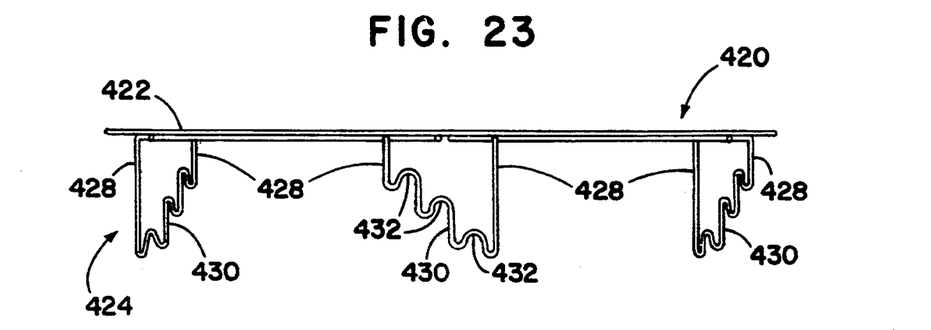
FIG. 23 is a side view of the rack shown in FIG. 22.

The legs are also made of wire, preferably a single piece of wire of approximately the same thickness as the rack surface. Each of the legs is made up two attachment segments 426, two straight segments 428 and a connecting segment 430. The attachment segments 426 are fixedly attached to the rack surface, preferably by welding. The straight segments 428 extend downwardly, preferably perpendicularly, from the rack surface.

Figure 21:
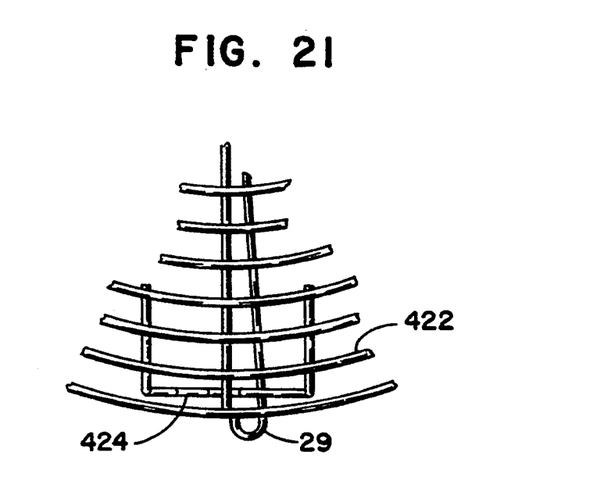
FIG. 21 is an enlarged bottom view showing the manner in which prefered cooking racks rest upon one another.

The connecting segments 430 connect the two straight segments 428 together and preferably include a plurality of U-shaped portions 432. The U-shaped portions 432 are located at varying distances away from the rack surface so as to provide adjustability to the racks. As shown in FIGS. 20 and 21, the U-shaped portions may rest on the wire of cooking rack 29. The height to the rack 420 above cooking rack 29 can be adjusted by varying which set of U-shaped portions are placed on the cooking rack 29.

Figure 23A:
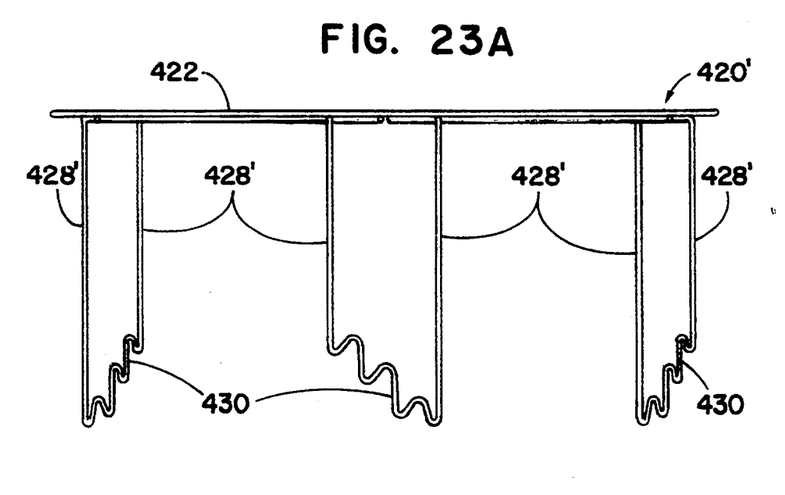
FIG. 23A is a side view showing an alternative preferred cooking rack.
Figure 23B:
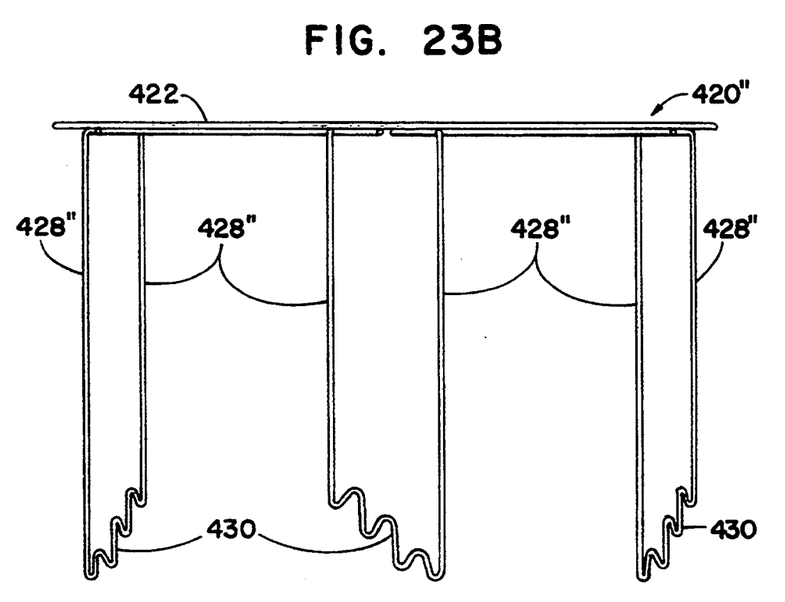
FIG. 23B is a side view showing an additional preferred cooking rack.

The rack 420' shown in FIG. 23A is identical to that shown in FIG. 23, except that the straight segments 428' are longer than those of FIG. 23. Likewise, the rack 420' shown in FIG. 23B is indentical to the other disclosed racks, except that the straight segments 428' are even longer. For the rack 420, the range of adjustability may preferably be from about $\frac{3}{4}$" to 2". The rack 420' is repreably adjustable from about $3\frac{3}{4}$" to 5". The rack 420" is preferably adjustable from about $6\frac{1}{4}$" to $7\frac{1}{2}$". Together, these three racks provide for a great range of adjustability in the placement of food within the oven.

As shown in FIG. 20, the racks can be stacked so that more than one rack can be used at a time. In FIG. 20, the lower rack 420' is placed on the base rack 29, while the upper rack 420 is placed on the rack 420'. Alternatively, according to the present rack invention, it is also possible, for example, to place both racks 420 and 420' directly on the base rack 29.

In addition to providing a surface on which food can be placed, the racks 420, 420' and 420" also can serve as hold down racks to hold down food placed underneath the racks. The oven shown in FIG. 20 may develop very high speed air movement within the oven. This high air speed can result on the food being blown off the rack. By placing a rack 420 over the food which has been placed on a lower rack, the problem of blowing food off the rack is greatly reduced.

The foregoing constitutes a description of various preferred embodiments. Numerous changes to the preferred embodiments are possible without departing from the spirit and scope of the invention. Hence, the scope of the invention should be determined with reference not to the preferred embodiments, but to the following claims.

What is claimed is:

1. A countertop oven, comprising:
   an upper enclosure member and a lower enclosure member which together form a cooking chamber;
   a cooking surface formed within the cooking chamber on which food to be cooked may be placed;
   a plurality of racks disposed within the cooking chamber, each of the racks comprising:
   a rack surface; and
   a plurality of legs attached to the rack surface, each of the legs being made of wire and having two straight segments extending downwardly from the rack surface and a connecting segment which connects together the straight segments, the connecting segment being shaped so as to allow the rack surface to be placed at one of a plurality of predetermined distances above the surface.

2. The oven as claimed in claim 1, wherein the connecting segments of one of the racks rests on the cooking surface, and wherein the connecting segments of another of the racks rests on the rack surface of the one of the racks.

3. The oven as claimed in claim 1, wherein the rack surfaces of the racks are made of wire and are suitable to support food thereon.

4. The oven as claimed in claim 1, wherein the rack surface of one of the racks is positioned above the cooking surface so as to hold down food placed on the cooking surface.

5. The oven as claimed in claim 4, wherein the rack surface of another of the racks is positioned above the rack surface of the one of the racks so as to hold down food placed on the rack surface of the one of the racks.

6. The oven as claimed in claim 1, wherein the connecting segments of the racks each comprise a plurality of U-shaped portions located at different distances from the rack surface.

7. A countertop oven, comprising:
   an upper enclosure member and a lower enclosure member which together form a cooking chamber;
   a cooking surface formed within the cooking chamber on which food to be cooked may be placed;
   a plurality of racks disposed within the cooking chamber, each of the racks comprising:
   a rack surface; and
   a plurality of legs attached to the rack surface, each of the legs being made of wire and having two straight segments extending downwardly from the rack surface and a connecting segment which connects together the straight segments, the connecting segment being shaped so as to allow the rack surface to be placed at one of a plurality of predetermined distances above the surface, wherein the straight segments have a length and wherein the length of the straight segments of one of the racks is different than the length of the straight segments of another of the racks.

8. The oven as claimed in claim 7, wherein the connecting segments of the at least one of the racks and of the another of the racks rest on the cooking surface.

* * * * *